United States Patent [19]

Peltola et al.

[11] Patent Number: 5,638,359
[45] Date of Patent: Jun. 10, 1997

[54] METHOD FOR CONGESTION MANAGEMENT IN A FRAME RELAY NETWORK AND A NODE IN A FRAME RELAY NETWORK

[75] Inventors: Tero Peltola, Helsinki; Jorma Matakselkä, Vantaa; Esa Harju, Espoo; Heikki Salovuori, Helsinki; Jukka Keskinen, Vantaa; Kari Mäkinen, Helsinki; Olli Roikonen, Espoo, all of Finland

[73] Assignee: Nokia Telecommunications OY, Espoo, Finland

[21] Appl. No.: 454,233

[22] PCT Filed: Dec. 14, 1993

[86] PCT No.: PCT/FI93/00538

§ 371 Date: Aug. 1, 1995

§ 102(e) Date: Aug. 1, 1995

[87] PCT Pub. No.: WO94/14264

PCT Pub. Date: Jun. 23, 1994

[30] Foreign Application Priority Data

Dec. 14, 1992 [FI] Finland .................................. 925670

[51] Int. Cl.⁶ .................................................. H04J 3/24
[52] U.S. Cl. .................................................. 370/229
[58] Field of Search .......................... 370/85.6, 17, 94.1, 370/60, 60.1, 94.2

[56] References Cited

U.S. PATENT DOCUMENTS

| | | | |
|---|---|---|---|
| 5,014,265 | 5/1991 | Hahne et al. | 370/60 |
| 5,121,383 | 6/1992 | Golestani | 370/60 |
| 5,132,966 | 7/1992 | Hayano et al. | 370/85.6 |
| 5,140,584 | 8/1992 | Suzuki | 370/85.6 |
| 5,251,209 | 10/1993 | Jurkevich et al. | 370/85.6 |
| 5,267,232 | 11/1993 | Katsube et al. | 370/85.6 |
| 5,303,237 | 4/1994 | Bergman et al. | 370/85.6 |

FOREIGN PATENT DOCUMENTS

| | | |
|---|---|---|
| 0422717 | 4/1991 | European Pat. Off. . |
| 2261798 | 5/1993 | United Kingdom . |

Primary Examiner—Douglas W. Olms
Assistant Examiner—Min Jung
Attorney, Agent, or Firm—Cushman Darby & Cushman IP Group of Pillsbury Madison & Sutro LLp

[57] ABSTRACT

A method for congestion management in a frame relay network, in which a virtual channel associated with a frame to be transferred is determined. In other to provide a congestion management method which is reliable and capable of rapid responding and which allows even virtual connections to be prioritized with respect to the throughput probability, (a) at least some of the virtual channels are assigned a respective service level; (b) a congestion level having values in a predetermined relationship to the values of the service levels is determined for a network resource liable to congestion; (c) the value representing the service level of the virtual channel of the FR frame (39) is compared with the value representing the congestion level of the network resource; and (d) when the result of the comparison falls outside a predetermined value range, the frame is discarded.

6 Claims, 3 Drawing Sheets

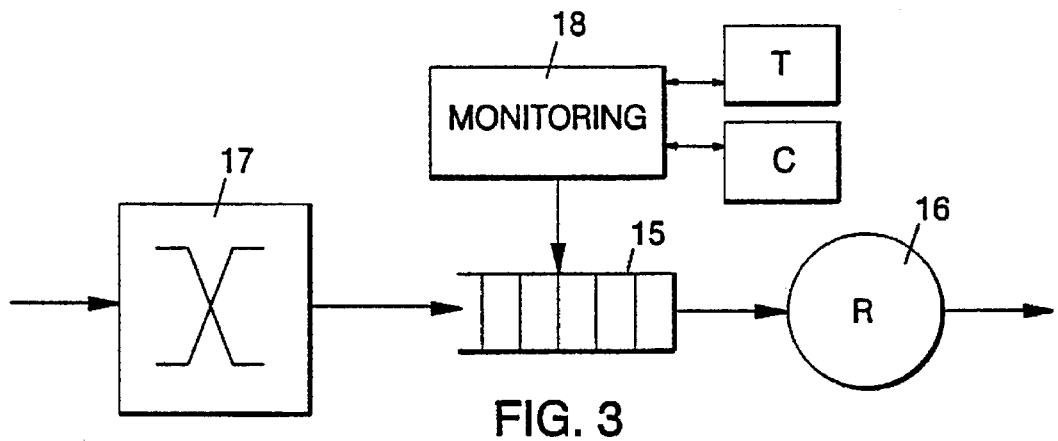
FIG. 3
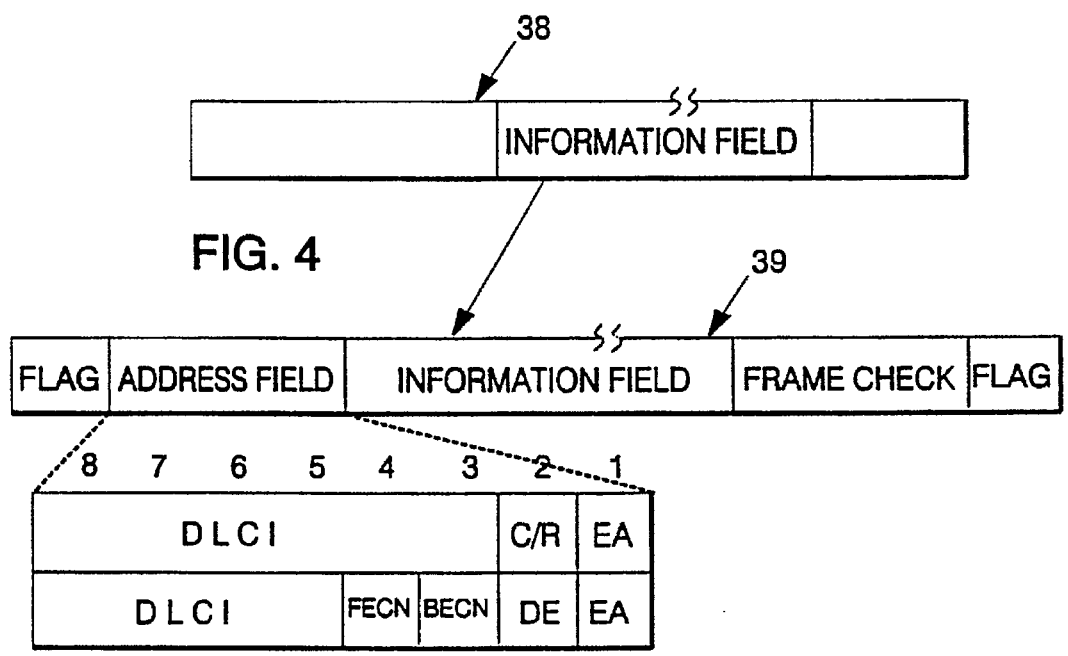
FIG. 4
FIG. 5

METHOD FOR CONGESTION MANAGEMENT IN A FRAME RELAY NETWORK AND A NODE IN A FRAME RELAY NETWORK

BACKGROUND OF THE INVENTION

The invention relates to a method for congestion management in a frame relay network, wherein a virtual channel associated with a frame to be transferred is determined. The invention further relates to a node in a frame relay network, comprising at least one resource liable to congestion, such as a buffer.

Congestion means a situation in which the number of transmission requests exceeds the transmission capacity at a certain network point (called a bottle-neck resource) at a specific time. Congestion usually results in overload conditions, as a result of which the buffers overflow, for instance, and so packets will be retransmitted either by the network or the subscriber. The function of congestion management (CM) is to maintain a balance between the transmission requests and the transmission capacity so that the bottle-neck resources operate on an optimal level, and the subscribers are offered service in a way that assures fairness.

Congestion management can be divided into congestion avoidance (CA) and congestion recovery (CR). Congestion avoidance methods aim at preventing the occurrence of congestion in the network by dynamically adjusting the bandwidth of the subscribers in accordance with network congestion conditions and/or by altering the network routing so that part of the traffic load of the bottle-neck resources is shifted to idle resources. The purpose of recovery methods, in turn, is to restore the operation of the bottle-neck resources to an optimal level if the avoidance methods have failed to prevent the occurrence of congestion.

The frame relay (FR) technique is a packet-switched network technique used for the transmission of frames of varying length in place of the packet-switched network connections presently in use. The protocol (X.25) applied generally in the present packet-switched networks requires plenty of processing and the transmission equipment is expensive, as a result of which the speeds also remain low. These matters are due to the fact that the X.25 standard was developed when the used transmission connections were still rather prone to transmission errors. The starting point of the frame relay technique was a considerably lower transmission line error probability. It has therefore been possible to discard a number of unnecessary functions in the frame relay technique, thus making the delivery of frames rapid and efficient. The Frame Mode Bearer Service is described generally in the CCITT specification I.233 (Reference 1) and the associated protocol in the specification Q.922 (Reference 2). Congestion in an FR network and congestion management mechanisms are described in the CCITT specification I.370 (Reference 3). For a more detailed description of the FR technique, *An Overview of Frame Relay Technology*, Datapro Management of Data Communications, McGraw-Hill Incorporated, April 1991, (Reference 4) as well as the above-mentioned specifications are referred to.

The recommendations defined in the CCITT specifications offer a few mechanisms for congestion notification. For instance, the recommendation I.370 shares the network congestion management between the nodes and the subscribers of the network. According to it, the subscriber should adjust the amount of traffic on the basis of congestion notifications received from the network, and the network, in turn, should do the same on the basis of congestion notifications received from the subscriber. In other words, if the network notifies the subscriber of congestion, the subscriber should reduce its traffic to the network, and vice versa. This co-operation would thus make the network a kind of closed system as far as the congestion management is concerned. However, this kind of congestion management is not operative in practice, mainly for two reasons:

—notification mechanisms offered by the specification are too slow to respond to momentary congestion situations; and —one cannot rely on the subscribers voluntarily reducing traffic even if they receive congestion notifications from the network. In such a case the congestion management system is not, in fact, closed, and congestion will not be relieved.

Another drawback of known methods is that all subscribers are treated equally under congestion conditions, and so it is not possible to give priority to the messages of subscribers wanting better service (i.e. applications requiring better service) with respect to the throughput probability.

SUMMARY OF THE INVENTION

The object of the present invention is to eliminate the above-described disadvantages and provide a new congestion management method for use in the FR network, which method is reliable and capable of rapid responding. The new method also enables the prioritizing of virtual connections with respect to throughput probability. This is achieved by a method according to the invention, which is characterized in that at least some of the virtual channels are assigned a respective service level; a congestion level having values in a predetermined relationship to the values of the service levels is determined for a network resource liable to congestion; the value representing the service level of the virtual channel of the FR frame is compared with the value representing the congestion level of the resource; and when the result of the comparison falls outside a predetermined value range, the frame is discarded. The FR network node according to the invention, in turn, is characterized in that it comprises means for storing service level values corresponding to virtual channels; means for determining the congestion level of the resource liable to congestion; means for comparing the value representing the congestion level and the value representing the service level; and means for discarding a frame in response to the result of the comparison.

The invention rests on the idea that virtual channels are classified according to the service level desired by the respective subscriber, and that frames with a lower service level are discarded under congestion conditions so that the service offered in a congestion situation will be as optimal as desired by the subscriber with respect to the frame throughput probability.

BRIEF DESCRIPTION OF THE DRAWINGS

In the following the invention and its preferred embodiments will be described in greater detail with reference to the examples shown in the attached drawings, in which

FIG. 3 illustrates congestion management means associated with each output or input buffer in the node shown in FIG. 2;

FIG. 4 illustrates the format of a frame to be delivered in an FR network;

FIG. 5 shows a congestion level table provided for a buffer; and

DETAILED DESCRIPTION

Figure 1:
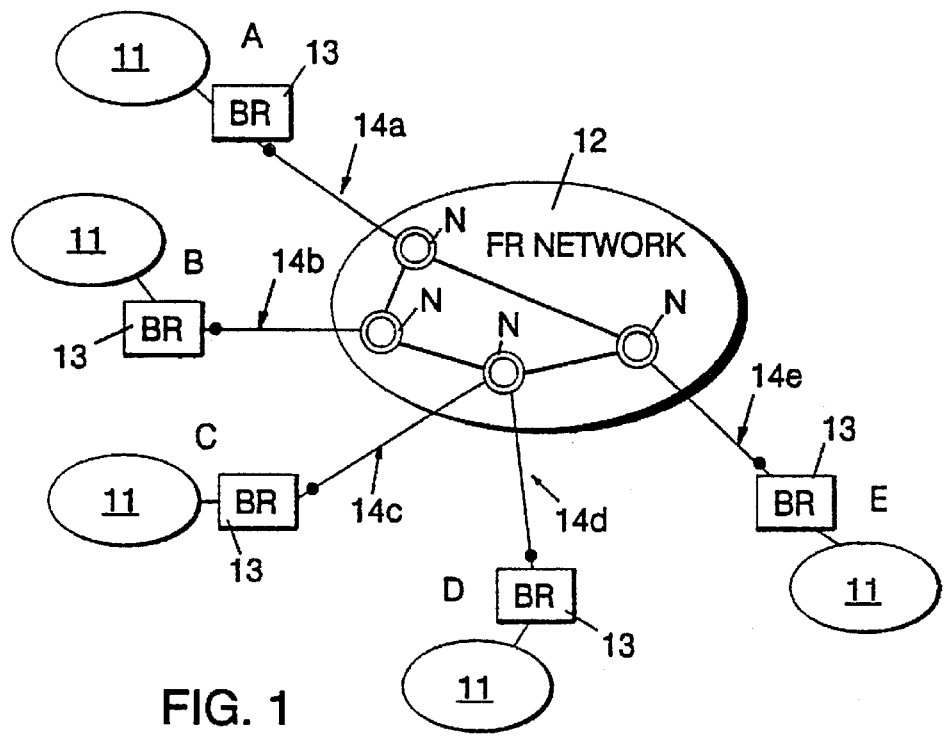
FIG. 1 illustrates a typical operating environment of the method according to the invention.

FIG. 1 shows an FR network offering public network services, that is, a frame relay network 12 interconnecting local area networks 11 of different offices A . . . E of a single corporation or a plurality of corporations. The local area network 11 of each office has access to the FR service via a local area network bridge 13 and a data link connection indicated with the references 14a . . . 14e, respectively. The connection between an FR subscriber A . . . E and an FR network node N is known per se, wherefore it will not be described more closely herein. More detailed information about local area networks and bridges used in their interconnection can be found e.g. in an article by Michael Grimshaw *LAN Interconnections Technology*, Telecommunications, February 1991, and in *Lähiverkko-opas*, Leena Jaakonmäki, Suomen ATK-kustannus Oy, 1991, which are incorporated herein by reference.

Figure 2:
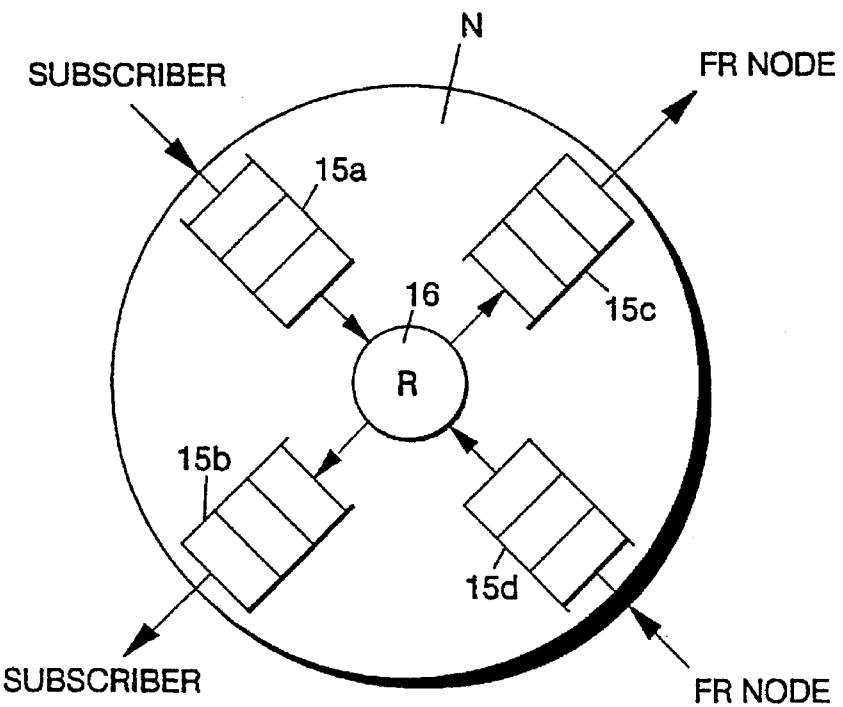
FIG. 2 is a simplified view of an FR network node in which the method according to the invention is applied.

FIG. 2 is a simplified view of the node N in the FR network 12. An FR frame from a subscriber is received in an input buffer 15a, from which it is connected to a centralized router 16 routing it to an appropriate output buffer 15b or 15c, which may be either an output buffer 15b connected to another subscriber connection or an output buffer 15c connected to an FR trunk connection (which is an internodal data link connection in the FR network).

The fill rate of each output and input buffer in the FR network node (only one input buffer, indicated by the reference numeral 15, is shown in FIG. 3) is monitored by a monitoring unit 18 (which for the sake of clarity is not shown in FIG. 2). According to the invention, each virtual channel is assigned a fixed service level selectable by the subscriber. (The virtual channel means a virtual connection portion having the length of one transmission link, while the virtual connection is the actual packet-switched end-to-end FR connection.) The service level is a number (or another identifier) within a predetermined range, such as 0 . . . LEVELX, which represents the quality of service offered under congestion conditions to the subscriber connected to the virtual connection. In this way, each user application can be offered the service level desired by the subscriber, thus prioritizing different virtual connections with respect to the throughput probability in the FR network. The service level may be an option the operator sells the subscriber and/or the operator may use the service level to prioritize its own management connections.

According to the invention, a network-specific constant LEVELX+1 is always applied in the operation of the FR network. The constant indicates the number of different service levels specified in the network.

The frame of the subscriber LAN 11 is inserted into the information field of the FR frame in the bridge 13 (with the exception of timing bits and other similar bits). FIG. 4 illustrates the insertion of a LAN frame 38 into the information field of an FR frame 39. It also shows a typical FR network frame format where the address field preceding the information field comprises two octets (bits 1 to 8). The bits 3 to 8 of the first octet and the bit 5 to 8 of the second octet form a data link connection identifier DLCI, which indicates to the node e.g. the virtual connection and virtual channel to which a particular frame belongs. The virtual channels are distinguished from each other by means of the data link connection identifier. The data link connection identifier, however, is unambiguous only over a single virtual channel, and it may change in the node on transition to the next virtual channel. In the invention, the bit 2 of the second address field octet, called a DE bit (Discard Eligibility Indicator), is also significant. In accordance with the CCITT recommendation, it is allowable to discard a frame e.g. under congestion conditions if the DE bit of the frame has been set to one. As the other bits in the FR frame are not relevant to the present invention, they will not be described more closely herein. References 2 and 4 mentioned above are referred to for a more detailed description.

A frame 39 of the format described above is received at the input buffer 15 of the node N from the switching field 17 of the node (FIG. 3, not shown in FIG. 2). The monitoring unit 18 determines the service level value corresponding to the virtual channel indicated by the data link connection identifier DLCI. The virtual channels and the values of the service levels corresponding to them may be stored e.g. in a table T.

In addition to assigning a service level specifically for each virtual channel, the method according to the invention also determines the congestion level of a resource liable to congestion, buffer 15 in the example of FIG. 3. For this purpose, a congestion level table C is provided for such a resource for finding out the level of congestion of the resource. FIG. 5 shows in greater detail the congestion level table provided for the buffer 15. In this specific case, the table comprises a congestion level column where the congestion level of the buffer memory has four different values ranging from 0 to 3; a second column containing the threshold values of the buffer memory fill rate when the level of congestion is rising; and a third column containing the threshold values of the buffer memory fill rate when the level of congestion is falling. The monitoring unit 18 monitors continuously the fill rate of the buffer memory 15 and determines the level of congestion of the buffer memory by means of the congestion level table C. When the level of congestion is rising, the monitoring unit uses the first and the second column of the congestion level table, and when the level of congestion is falling, it uses the first and the third column. When the level of congestion is rising and the fill rate exceeds the threshold set forth in the table, the level of congestion shift to the next higher level. For example, when the fill rate exceeds 30%, a shift from the congestion level 0 to congestion level 1 takes place (the value of the congestion level changes from 0 to 1); correspondingly, when the fill rate exceeds 50%, a shift to the congestion level 2 takes place. Similarly, when the congestion is decreasing and falls below the threshold set forth in the column, a shift to the next lower congestion level takes place. For example, when the fill rate falls below 20%, a shift from the congestion level 1 to the congestion level 0 takes place. The threshold values corresponding to a certain congestion level are intentionally unequal. The significance of this matter will be described below.

Figure 6:
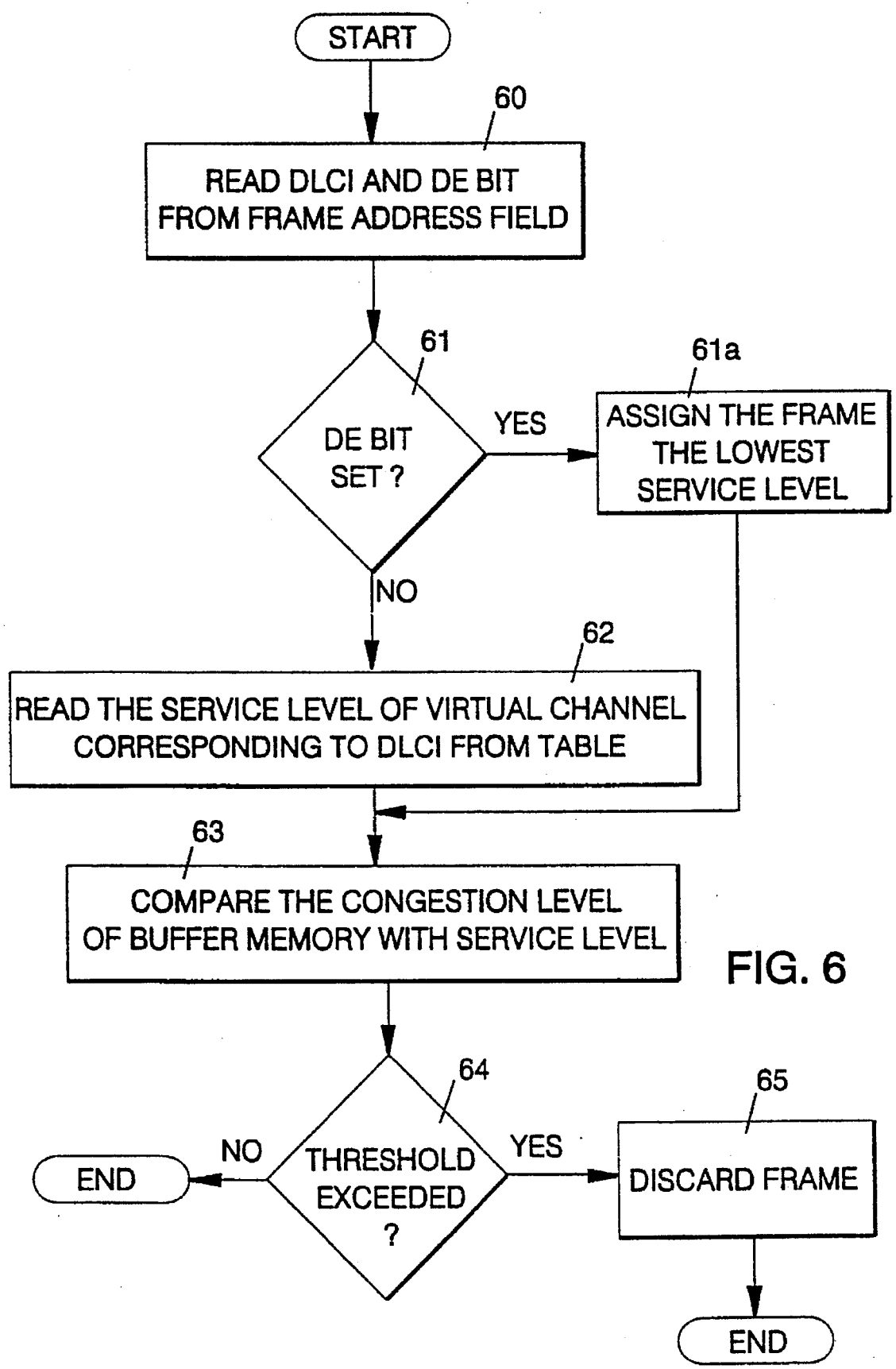
FIG. 6 is a flow chart illustrating the method according to the invention, which is applied in each output and input buffer of the node.

The main stages of the congestion management method according to the invention are shown in FIG. 6. When a frame 39 of the format shown in FIG. 4 enters the buffer 15, the monitoring unit 18 reads the data link connection identifier DLCI and the DE bit from the address field of the frame (stage 60). If the DE bit has been set to one, the frame is automatically assigned the lowest service level (in this example the level 0), irrespective of the service level of the virtual connection to which the frame belongs (stage 61a). If the DE bit has not been set to one, the monitoring unit searches the table T for the service level value corresponding to the virtual channel indicated by the data link connection identifier (stage 62). This service level value, or alternatively the lowest service level value assigned at stage 61a, is then compared (stage 63) with the current congestion level value obtained from the congestion level table C. If the congestion level value exceeds the service level value, the monitoring unit 18 discards the frame (stage 65). If this is not the case, the frame is forwarded in a normal way. The throughput of frames with a higher level of priority (a higher service level) can thus be ensured under congestion conditions by discarding frames having a lower congestion level. When a certain frame has been discarded, the application (protocol) takes care of its retransmission.

In addition to the stages shown in FIG. 6, the monitoring unit 18 monitors continuously the fill rate of the buffer memory 15 and updates the value of the congestion level by means of the congestion level table C.

The method stages according to the invention, illustrated in FIG. 6, are applied only to frames the integrity of which has been checked and in which no errors have been detected and the DLCI has been defined for the link in question. If errors are detected or it is found out that the DLCI has not been defined for the link in question, the frame is discarded. As these stages, however, do not fall within the idea of the invention, they are not shown in FIG. 6.

The thresholds corresponding to a certain congestion level are unequal in the rising and falling direction of the congestion level in order that the level of congestion would not disturbingly often vary between two adjacent levels.

Even though the invention has been described above with reference to the examples of the attached drawings, it is obvious that the invention is not restricted to it, but it may be modified within the inventive idea disclosed above and in the attached claims. Accordingly, even if the invention has been described with reference to a buffer memory, the method is applicable to any resource liable to congestion. The threshold values of the congestion levels need not necessarily be equal to the service level values (0 . . . 3), provided that the values of the two levels have such a predetermined relationship to each other that they can be compared and a threshold can be set below which frames will be discarded. The simplest case, however, is the one described above, where the value of the congestion level can be compared directly with the value of the service level. Frames having their DE bit set may also be assigned some other service level value than the lowest one. The service level value of such frames need not necessarily be lower than the service level of the virtual connection to which the frame belongs.

We claim:

1. A method for managing congestion in a frame relay network, comprising the steps of:

determining a plurality of virtual channels associated with respective frames to be transferred over the frame relay network;

assigning respective service levels, having values, for at least some of said virtual channels;

determining a congestion level having a varying value in a predetermined relationship to the values of the service levels, for a network resource liable to congestion;

for each frame to be transferred, comparing the value representing the respective service level of the respective virtual channel of the respective frame, with the value representing the corresponding existing congestion level of said resource; and discarding each respective frame when the result of the comparison falls outside a predetermined value range.

2. The method according to claim 1, wherein:

all of said virtual channels are assigned a respective said service level.

3. The method according to claim 1, wherein:

all FR frames having a DE bit thereof set, are assigned the lowest of said service level values, irrespective of the service level of the virtual channel to which the respective frame belongs.

4. The method according to claim 1, wherein:

identical numerical values are used as said service level values and the corresponding said congestion level values.

5. The method according to claim 1, wherein:

said resource liable to congestion is a buffer memory, and said level of congestion is determined by utilizing a congestion level table comprising two buffer memory fill rate thresholds for each congestion level, one for rising congestion, and another for falling congestion.

6. A node in a frame relay network, comprising:

a buffer;

means for storing service level values corresponding to virtual channels;

means for determining a varying congestion level of a resource of the frame relay network which is liable to congestion;

means for comparing values representing the existing congestion level of said resource and the corresponding value representing the service level to obtain respective results; and means for discarding a respective frame arranged to be transferred over the frame relay network, in response to the respective result of said comparison.

* * * * *

UNITED STATES PATENT AND TRADEMARK OFFICE
CERTIFICATE OF CORRECTION

PATENT NO. : 5,638,359

DATED : June 10, 1997

INVENTOR(S) : PELTOLA et al

It is certified that error appears in the above-identified patent and that said Letters Patent is hereby corrected as shown below:

On the title page:

Please change:

"[75] Inventors: Tero Peltola, Helsinki . . . Jorma Matakselka, Vantaa. . ."

to

—[75] Inventors: Tero Peltola, Helsinki . . . Jorma Matkaselkä, Vantaa. . . —

Signed and Sealed this

Seventh Day of April, 1998

*Attest:*

BRUCE LEHMAN

*Attesting Officer*     *Commissioner of Patents and Trademarks*